US010547251B1

(12) United States Patent
Pan et al.

(10) Patent No.: US 10,547,251 B1
(45) Date of Patent: Jan. 28, 2020

(54) METHOD FOR SHUTDOWN OF AN ACTIVE NEUTRAL POINT CLAMPED CONVERTER

(71) Applicant: General Electric Company, Schenectady, NY (US)

(72) Inventors: Di Pan, Schenectady, NY (US); Mark Edward Dame, Niskayuna, NY (US); Di Zhang, Niskayuna, NY (US); Jiangbiao He, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/192,668

(22) Filed: Nov. 15, 2018

(51) Int. Cl.
*H02M 7/487* (2007.01)
*H02M 1/08* (2006.01)
*H02M 7/539* (2006.01)
*H02M 1/00* (2006.01)

(52) U.S. Cl.
CPC ............. *H02M 7/487* (2013.01); *H02M 1/08* (2013.01); *H02M 7/539* (2013.01); *H02M 2001/0058* (2013.01)

(58) Field of Classification Search
None
See application file for complete search history.

(56) References Cited

U.S. PATENT DOCUMENTS

| 8,144,490 | B2 | 3/2012 | El-Barbari et al. |
| 8,228,695 | B2 | 7/2012 | Roesner et al. |
| 8,929,114 | B2 | 1/2015 | Li et al. |
| 9,344,005 | B2 | 5/2016 | Ho et al. |
| 9,525,348 | B1 | 12/2016 | Aeloiza et al. |
| 9,543,855 | B2 | 1/2017 | Soeiro et al. |
| 2012/0218785 | A1* | 8/2012 | Li ........................ H02M 1/34 363/21.12 |

(Continued)

FOREIGN PATENT DOCUMENTS

| EP | 1325550 B1 | 3/2010 |
| EP | 2871765 A1 | 5/2015 |
| WO | 2016079039 A1 | 5/2016 |

OTHER PUBLICATIONS

Li et al.,"Three-Level Active Neutral-Point-Clamped (ANPC) Converter with Fault Tolerant Ability", 2009, IEEE, pp. 840-845 (Year: 2009).*

(Continued)

*Primary Examiner* — Jeffrey A Gblende
(74) *Attorney, Agent, or Firm* — Christopher R. Carroll; The Small Patent Law Group LLC

(57) ABSTRACT

A method for shutting down a phase-leg of a three-level active neutral point clamped converter is provided. The method includes the following steps. A determining step determines if a switch fault has occurred, and if a switch fault has occurred then each switch of the plurality of switches are turned off. If a switch fault has not occurred and a shutdown is requested, then an operating step operates the plurality of switches to turn off a first switch and a fourth switch. A waiting step waits for a first predetermined time period. An operating step operates the plurality of switches to turn on a second switch and a third switch. A waiting step is repeated. An operating step operates the plurality of switches to turn off a fifth switch and a sixth switch. A waiting step is repeated. An operating step turns off the second switch and the third switch.

20 Claims, 7 Drawing Sheets

(56) References Cited

U.S. PATENT DOCUMENTS

| | | | | |
|---|---|---|---|---|
| 2013/0088901 A1* | 4/2013 | Bleus | ............... | H02M 7/487 |
| | | | | 363/71 |
| 2018/0062537 A1* | 3/2018 | Wang | ............... | H02M 1/08 |
| 2018/0097453 A1* | 4/2018 | Xu | ............... | H02J 3/38 |
| 2018/0152097 A1* | 5/2018 | Ying | ............... | H02M 7/487 |

OTHER PUBLICATIONS

Gurpinar et al., "Performance analysis of SiC MOSFET based 3-level ANPC grid-connected inverter with novel modulation scheme", 2014 IEEE 15th Workshop on Control and Modeling for Power Electronics (COMPEL), pp. 1-7, 2014.

Jiao Yang, "High Power High Frequency 3-level NPC Power Conversion System", virginia tech, Sep. 25, 2015.

Jiao et al., "New Modulation Scheme for Three-Level Active Neutral-Point-Clamped Converter With Loss and Stress Reduction", IEEE Transactions on Industrial Electronics, vol. 62, Issue: 9, pp. 5468-5479, Sep. 2015.

\* cited by examiner

METHOD FOR SHUTDOWN OF AN ACTIVE NEUTRAL POINT CLAMPED CONVERTER

STATEMENT REGARDING FEDERALLY SPONSORED RESEARCH AND DEVELOPMENT

This invention was made with Government support under contract number NNC15CA29C awarded by the National Aeronautics and Space Administration (NASA). The Government has certain rights in the invention.

BACKGROUND

Embodiments of the present specification relate generally to a neutral point clamped converter, and more specifically to a shutdown method for the active neutral point clamped converter.

Typically, three-level active neutral point clamped (3L-ANPC) converters are employed to convert a direct current (DC) power to an alternating current (AC) power having a three-level output. The 3L-ANPC converters are widely used in AC drives and flexible AC transmission systems. These 3L-ANPC converters employ a plurality of switches to aid in the power conversion. Also, traditionally, 3L-ANPC converters that employ silicon carbide (SiC) switches such as SiC metal-oxide-semiconductor field-effect transistors (MOSFETs) are used when it is desirable to withstand a high voltage.

As will be appreciated, SiC MOSFETs switch faster in comparison to other switches such as insulated gate bipolar transistors (IGBTs), thereby resulting in lower switching losses. However, the faster switching of the SiC MOSFETs also leads to higher voltage stress across the SiC MOSFETs of the traditional 3L-ANPC converters due to a commutation loop inductance. Typically, in the traditional 3L-ANPC converters that employ SiC MOSFETs, large commutation loops or both the large commutation loops and small commutation loops are formed. Formation of the large commutation loops results in an increased loop inductance in the traditional 3L-ANPC converters. This increase in the loop inductance results in an increase in the voltage stress across the SiC MOSFETs, thereby resulting in a reduced lifetime of the SiC MOSFETs in the traditional 3L-ANPC converters or a converter design with reduced efficiency.

Moreover, the SiC MOSFETs typically leverage a MOSFET body diode as an anti-parallel diode to reduce cost and space. Further, in the traditional 3L-ANPC converters, the MOSFET body diodes in some SiC MOSFETs are operated to conduct current for extended periods of time. However, such body diodes cannot conduct high current for extended periods of time due to thermal and reliability constraints, thereby leading to poor reliability of the traditional 3L-ANPC converters.

When a 3L-ANPC converter is designed to only commutate in small commutation loop, overvoltages can occur during shutdown, e.g., caused by a sudden trip event. The overvoltage during a sudden shutdown is due to commutation of current using a large commutation loop, which is not used in normal operation. The leakage inductance of the large commutation loop includes not only the leakage inductance of the module, but also the external busbar. Therefore, the voltage stress at the device will be much higher when a large commutation loop is used. The modulator is designed to only use small commutation loops so that the switching speed can be increased for high efficiency, and at the same time to avoid stressing the power electronic devices. Nevertheless, when all devices are turned off at the same time during a trip event, it is possible that a large commutation loop is used. Assuming the turn-off time of a SiC MOSFET is shorter than a Si IGBT, there are multiple scenarios where the converter can potentially be damaged by overvoltage.

BRIEF DESCRIPTION

In accordance with one aspect of the present disclosure, a method for shutting down a phase-leg of a three-level active neutral point clamped converter is provided. The phase-leg includes an output terminal, a plurality of input terminals, and a plurality of switches disposed therebetween. The method includes the following steps. A determining step determines if a switch fault has occurred, and if a switch fault has occurred then each switch of the plurality of switches are turned off. If a switch fault has not occurred and a shutdown is requested, then an operating step operates the plurality of switches to turn off a first switch and a fourth switch. A waiting step waits for a first predetermined time period to elapse. An operating step operates the plurality of switches to turn on a second switch and a third switch. A waiting step waits for a second predetermined time period to elapse. An operating step operates the plurality of switches to turn off a fifth switch and a sixth switch. A waiting step waits for a third predetermined time period to elapse. An operating step operates the plurality of switches to turn off the second switch and the third switch.

In accordance with another aspect of the present disclosure, a three-level active neutral point clamped converter includes one or more phase-legs. At least one phase-leg of the one or more phase-legs includes an output terminal, a plurality of input terminals comprising a first input terminal, a second input terminal, and a neutral input terminal. A plurality of switches are disposed between the plurality of input terminals and the output terminal. The plurality of switches include a first switch, a second switch, a third switch, a fourth switch, a fifth switch, and a sixth switch. The first switch, the second switch, the third switch, and the fourth switch of the plurality of switches are operatively coupled in series. The first switch is operatively coupled to the first input terminal. The fourth switch is operatively coupled to the second input terminal. An interconnection point of the second switch and the third switch is operatively coupled to the neutral input terminal. The fifth switch is operatively coupled between an interconnection point of the first switch and the second switch and the output terminal. The sixth switch is operatively coupled between an interconnection point of the third switch and the fourth switch and the output terminal. A modulator is operatively coupled to the plurality of switches of the one or more phase-legs and is configured to determine if a switch fault has occurred. If a switch fault has occurred then each of the plurality of switches are turned off. If a switch fault has not occurred and a shutdown is requested, then the plurality of switches are operated to turn off a first switch and a fourth switch. A waiting step waits for a first predetermined time period to elapse. An operating step operates the plurality of switches to turn on a second switch and a third switch. Another waiting step waits for a second predetermined time period to elapse. An operating step operates the plurality of switches to turn off a fifth switch and a sixth switch. Another waiting step waits for a third predetermined time period to elapse. An operating step operates the plurality of switches to turn off the second switch and the third switch.

DRAWINGS

These and other features and aspects of embodiments of the present disclosure will become better understood when the following detailed description is read with references to the accompanying drawings in which like characters represent like parts throughout the drawings, wherein.

DETAILED DESCRIPTION

As will be described in detail hereinafter, various embodiments of an exemplary method for shutting down a three-level active neutral point clamped (3L-ANPC) converter are presented. Use of these methods results in the avoidance of damage to the 3L-ANPC converter in a fault trip event. In particular, the methods allow a flow of an electrical current through body diodes of switches of the 3L-ANPC converter for a reduced duration of time in comparison to traditional methods of shutting down 3L-ANPC converters resulting in improved life-time of the switches. Moreover, these methods lead to formation of small commutation loops within the phase-leg, thereby reducing an overall loop inductance of the phase-leg of the 3L-ANPC converter. Such a reduction in the overall loop inductance reduces voltage stress across the switches of the 3L-ANPC converter. Consequently, the life-time and the reliability of the 3L-ANPC converter may be improved.

In the effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

When describing elements of the various embodiments of the present specification, the articles "a", "an", "the" and "said" are intended to mean that there are one or more of the elements. The terms "comprising", "including" and "having" are intended to be inclusive and mean that there may be additional elements other than the listed elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
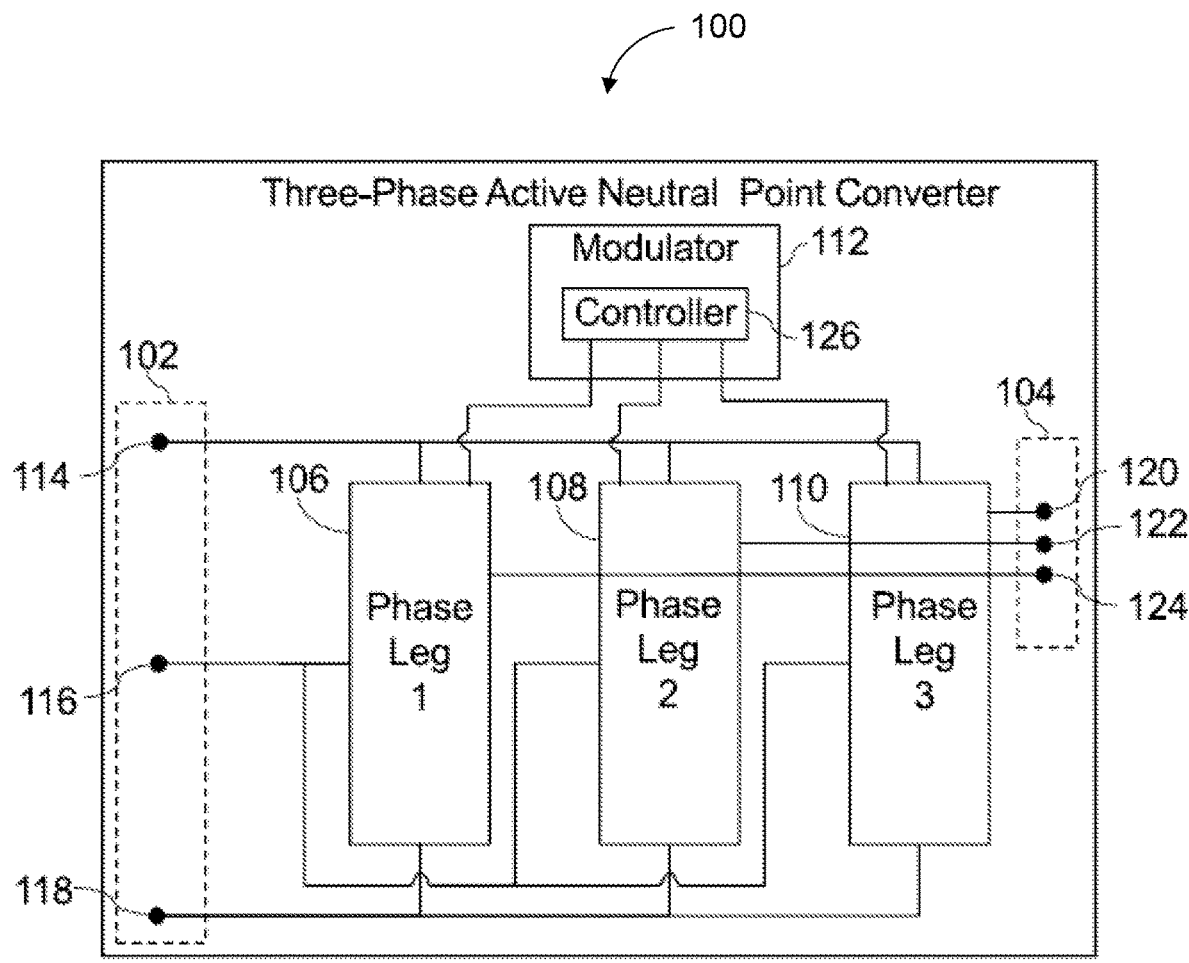
FIG. 1 is a block diagram of a three-level active neutral point clamped (3L-ANPC) converter, in accordance with aspects of the present disclosure.

FIG. 1 is a block diagram of a three-level active neutral point clamped (3L-ANPC) converter 100, in accordance with aspects of the present disclosure. By way of a non-limiting example, the 3L-ANPC converter 100 may be an inverter that facilitates conversion of a direct current (DC) power to or from an alternating current (AC) power. In a presently contemplated configuration, the 3L-ANPC converter 100 includes an input port 102, an output port 104, and one or more phase-legs 106, 108, 110 disposed between the input port 102 and the output port 104. Additionally, the 3L-ANPC converter 100 may also include a modulator 112 that is operatively coupled to the one or more phase-legs 106, 108, 110. The term "power" as used herein may be representative of a voltage, a current, or both the voltage and current.

It may be noted that use of the three phase-legs 106-110 in the 3L-ANPC converter 100 aids in generating a three-phase output at the output port 104. Although the 3L-ANPC converter 100 of FIG. 1 is shown as having the three phase-legs 106-110, use of a 3L-ANPC converter having less than three phase-legs or greater than three phase-legs is also contemplated. For example, a 3L-ANPC converter with one phase-leg may produce a single-phase output voltage. By way of another non-limiting example, a 3L-ANPC converter with two phase-legs may produce a two-phase output voltage.

The input port 102 includes a positive input terminal 114, a neutral input terminal 116, and a negative input terminal 118. These terminals 114, 116, 118 may be hereinafter collectively referred to as input terminals 114-118. The positive input terminal 114 may be maintained at a positive voltage, the negative input terminal 118 may be maintained at a negative voltage, and the neutral input terminal 116 may be maintained at a neutral voltage. In some embodiments, the positive voltage and the negative voltage may be non-zero potentials while the neutral voltage may be a zero potential or substantially close to a zero potential. In certain embodiments, the neutral voltage may also be a non-zero potential. The input terminals 114-118 of the input port 102 are electrically coupled to input terminals (see FIG. 2) of each of the phase-legs 106-110.

In the example of FIG. 1, a three-phase output voltage may be available at the output port 104 of the 3L-ANCP converter 100. The output port 104 includes output terminals 120, 122, 124 to supply the three-phase output voltage to any target electronic device (not shown) coupled to the 3L-ANCP converter 100. More particularly, a single-phase voltage may be supplied via each of the output terminals 120, 122, 124. These terminals 120, 122, 124 may be hereinafter collectively referred to as output terminals 120-124. In some embodiments, output terminals 120-124 of the output port 104 are electrically coupled to an output terminal (see FIG. 2) of each of the phase-legs 106-110. The output voltage at each of the output terminals 120-124 includes three levels such as a first level, a second level, and a neutral level. By way of example, the first level may be a positive voltage level, while the second level may be a negative voltage level. By way of another example, while the first level may be the negative voltage level, the second level may be the positive voltage level. Moreover, the neutral level may be a zero voltage or substantially close to a zero voltage. In certain embodiments, the neutral level may be a non-zero voltage.

The phase-legs 106, 108, 110 are electrically coupled to the input port 102 and the output port 104. Each of the phase-legs 106, 108, 110 is configured to convert the DC power received from the input port 102 to an AC power and supply the generated AC power to the output port 104 as a phase voltage and a phase current. More particularly, the phase-legs 106, 108, 110 are configured to provide the generated AC power to the corresponding output terminal 120, 122, 124. In some embodiments, one or more of the phase-legs 106-110 may include a plurality of switches (see FIG. 2) to facilitate conversion of the DC power to the AC power. The phase-legs 106-110 will be described in greater detail with reference to FIG. 2.

The modulator 112 is operatively coupled to the phase-legs 106-110. In the embodiment of FIG. 1, the modulator 112 is shown as a part of the 3L-ANPC converter 100. In certain embodiments, the modulator 112 may be disposed outside the 3L-ANPC converter 100.

In some embodiments, the modulator 112 may include a controller 126 configured to control operations of the phase-legs 106-110 to facilitate the conversion of the DC power to the AC power by the phase-legs 106-110. The controller 126 may include hardware elements such as a specially programmed general purpose computer, an electronic processor such as a microprocessor, a digital signal processor, and/or a microcontroller. Further, the controller 126 may include input/output ports and a storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, the controller 126 may be implemented using hardware elements such as circuit boards with processors, logic gates, or as software running on a processor such as a personal computer (PC), or a microcontroller.

The controller 126 may be operatively coupled to the phase-legs 106-110. More particularly, the controller 126 may be operatively coupled to the switches (see FIG. 2) of the phase-legs 106-110 and configured to control switching of the switches to facilitate conversion of the DC power to the AC power. The controller 126 may be configured to operate the phase-legs 106-110 such that loop inductances of the phase-legs 106-110 are reduced, consequently resulting in a reduction in the voltage stress on the switches of the phase-legs 106-110. Implementing the design of the 3L-ANPC converter 100 as described hereinabove results in improved life and reliability of the 3L-ANPC converter 100. The operation of the controller 126 will be described in greater detail with reference to FIGS. 2-5.

Figure 2:
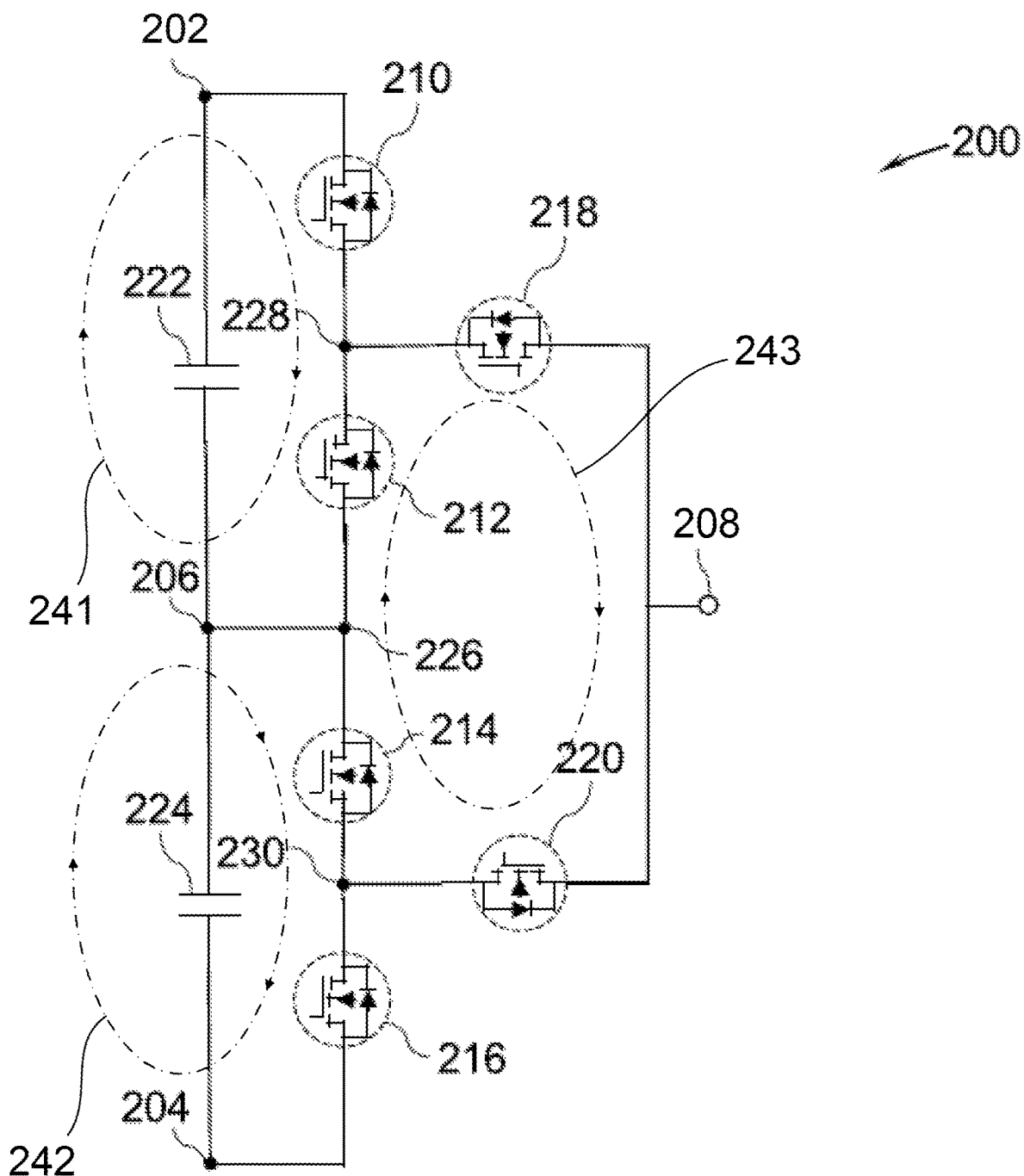
FIG. 2 is a schematic diagram of a phase-leg of the 3L-ANPC converter of FIG. 1, in accordance with aspects of the present disclosure.

Referring now to FIG. 2, illustrates a schematic diagram of one embodiment of a phase-leg 200 such as the phase-leg 106 of the 3L-ANPC converter 100 of FIG. 1, in accordance with aspects of the present disclosure. In some embodiments, the other phase-legs 108 and 110 may also have a configuration similar to the configuration of the phase-leg 200 depicted in FIG. 2. Also, FIG. 2 will be described with reference to the components of FIG. 1.

In some embodiments, the phase-leg 200 may include a plurality of input terminals such as a first input terminal 202, a second input terminal 204, and a neutral input terminal 206. The phase-leg 200 may also include a plurality of switches and an output terminal 208. The plurality of switches includes a first switch 210, a second switch 212, a third switch 214, a fourth switch 216, a fifth switch 218, and a sixth switch 220. The first switch 210, second switch 212, third switch 214, fourth switch 216, fifth switch 218, and sixth switch 220 are hereinafter collectively referred to as switches 210-220.

Although not depicted in FIG. 2, the first input terminal 202, the second input terminal 204, and the neutral input terminal 206 of the phase-leg 200 may be respectively operatively coupled to the positive input terminal 114, the negative input terminal 118, the neutral input terminal 116 of the 3L-ANPC converter 100 of FIG. 1. Also, the output terminal 208 of the phase-leg 200 may be operatively coupled to the output terminal 124 of the 3L-ANPC converter 100 of FIG. 1. Furthermore, a gate terminal of each of the switches 210-220 may be operatively coupled to the modulator 112 of the 3L-ANPC converter 100. More particularly, the gate terminal of each of the switches 210-220 may be operatively coupled to the controller 126 of the modulator 112.

One embodiment of the phase-leg 200 having six switches 210-220 is depicted in FIG. 2. However, the phase-leg 200 having greater than six or fewer than six switches is also contemplated. Moreover, the switches 210-220 depicted in FIG. 2 are silicon carbide (SiC) metal-oxide-semiconductor field-effect transistors (MOSFETs), where each switch may include a MOSFET element and a body diode. It may be noted that, the phase-leg 200 having other types of switches is also envisioned. Other non-limiting examples of the switches 210-220 include transistors, gate commutated thyristors, field effect transistors, insulated gate bipolar transistors (IGBT), gate turn-off thyristors, static induction transistors, static induction thyristors, or combinations thereof. Furthermore, materials used to form the switches 210-220 may include, but are not limited to, silicon (Si), germanium (Ge), SiC, gallium nitride (GaN), or combinations thereof.

As will be appreciated, a SiC switch module typically includes two switches. Therefore, in some embodiments, three such SiC modules may be used to form the phase-leg 200 of FIG. 2. By way of example, the switches 210 and 212 may belong to a first SiC switch module (not shown), the switches 214 and 216 may belong to a second SiC switch module (not shown), and the switches 218 and 220 may belong to a third SiC switch module (not shown). It may be noted that other types of SiC switch modules may also be used without limiting the scope of the present specification.

As depicted in FIG. 2, the first switch 210, the second switch 212, the third switch 214, and the fourth switch 216 are operatively coupled in series. More particularly, the switches 210-216 are coupled in series such that a source terminal of the first switch 210 is connected to a drain terminal of the second switch 212, a source terminal of the second switch 212 is connected to a drain terminal of the third switch 214, and a source terminal of the third switch 214 is connected to a drain terminal of the fourth switch 216. Further, the first switch 210 is operatively coupled to the first input terminal 202 and the fourth switch 216 is operatively coupled to the second input terminal 204. More particularly, as depicted in FIG. 2, a drain terminal of the first switch 210 is connected to the first input terminal 202, while a source terminal of the fourth switch 216 is connected to the second input terminal 204.

Furthermore, reference numeral 226 represents an interconnection point of the second switch 212 and the third switch 214. The interconnection point 226 is operatively coupled to the neutral input terminal 206. Also, reference numeral 228 represents an interconnection point of the first switch 210 and the second switch 212. The fifth switch 218 is operatively coupled between the interconnection point 228 and the output terminal 208. More particularly, in the example of FIG. 2, a drain terminal of the fifth switch 218 is connected to the interconnection point 228 and a source terminal of the fifth switch 218 is connected to the output terminal 208. Moreover, reference numeral 230 represents an interconnection point of the third switch 214 and the fourth switch 216. The sixth switch 220 is operatively coupled between the interconnection point 230 and the output terminal 208. In particular, a source terminal of the sixth switch 220 is connected to the interconnection point 230 and a drain terminal of the sixth switch 220 is connected to the output terminal 208.

Moreover, in some embodiments, the phase-leg 200 may also include capacitors 222 and 224. The capacitor 222 is connected between the first input terminal 202 and the neutral input terminal 206. Also, the capacitor 224 is connected between the second input terminal 204 and the neutral input terminal 206.

Overvoltage during a sudden shutdown of the converter is due to commutation using a large commutation loop. Small commutation loops are illustrated in FIG. 2 by lines 241, 242 and 243. The modulator is preferably designed to use only small commutation loops so that the switching speed can be increased for high efficiency, and at the same time to avoid stressing the power electronic devices (i.e., switches 210-220).

Figure 3:
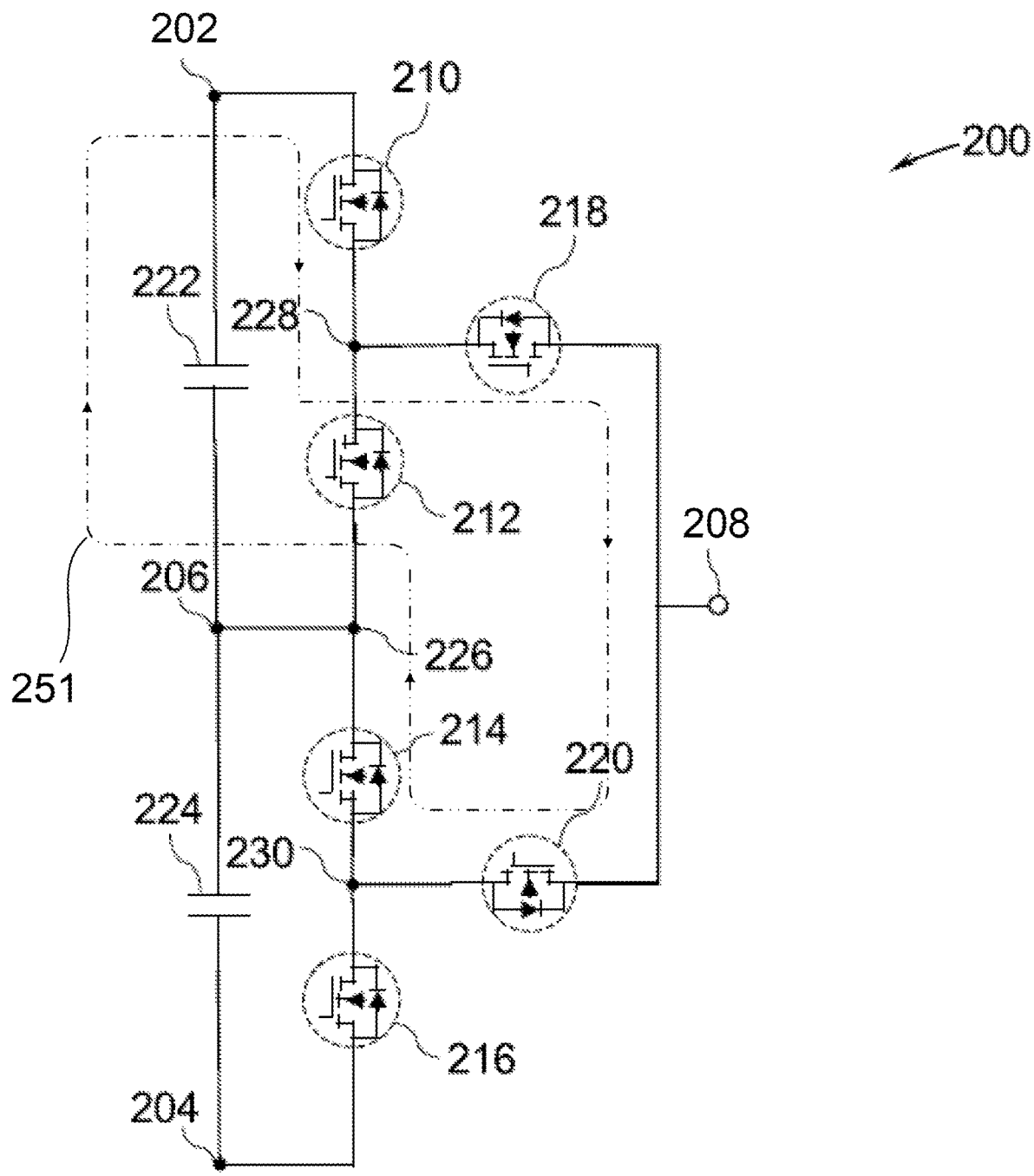
FIG. 3 is a schematic diagram of a phase-leg of the 3L-ANPC converter of FIG. 1, in accordance with aspects of the present disclosure.
Figure 4:
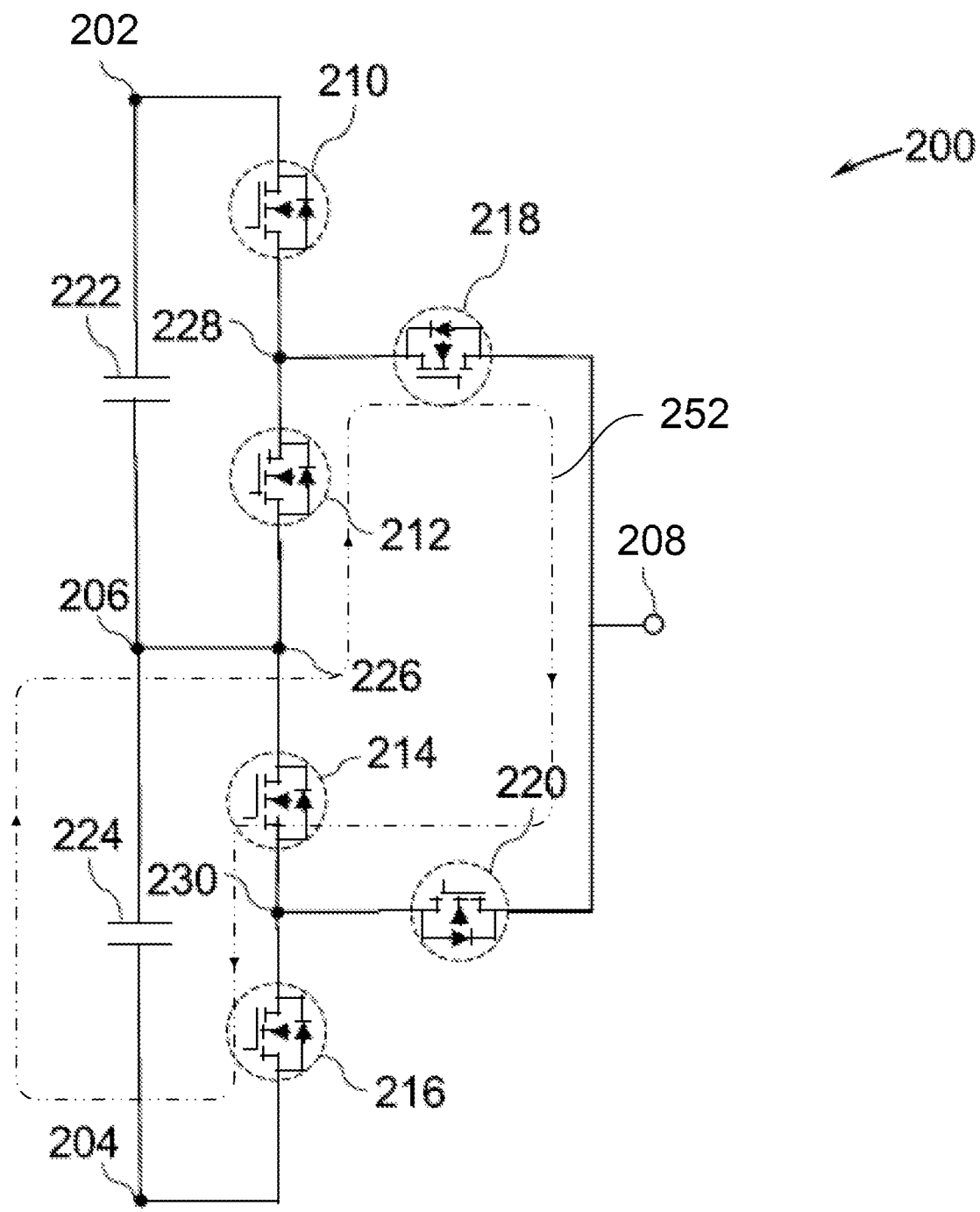
FIG. 4 is a schematic diagram of a phase-leg of the 3L-ANPC converter of FIG. 1, in accordance with aspects of the present disclosure.

FIGS. 3 and 4 illustrate schematic diagrams of a phase-leg such as the phase-leg 106 of the 3L-ANPC converter 100 of FIG. 1, in accordance with aspects of the present disclosure. Large commutation loops are illustrated in FIG. 3 by line 251 and in FIG. 4 by line 252. The leakage inductance of the large commutation loops includes the leakage inductance of the module, and also the leakage inductance of the external busbar. Therefore, the voltage stress at the individual switches will be much higher when a large commutation loop is used. When all switches 210-220 are turned off at the same time during a trip event it is possible that one of the large commutation loops is used. Assuming the turn-off time of a SiC MOSFET is shorter than a Si IGBT, it is reasonable to assume that overvoltage in the large commutation loops is likely, and the converter can potentially be damaged from this overvoltage.

To avoid damaging the converter 100, a safe shutdown sequence is needed to ensure the switches 210-220 are turned off in a safe manner. From a high level, the sequence is enforced so that use of a large commutation loop is avoided during converter shutdown. The shutdown method is shown in FIG. 5.

When a fault or shutdown is commanded, if it is triggered by a switch fault, all the switches in the phase that has fault can be turned off immediately. The fault will also trigger a converter fault in the processor, as a result, the other phases will be commanded to shut down. The reason of this choice is that during a switch fault, the phase leg could have already lost the capability of performing controlled shutdown. Although turning off all switches in the phase leg in this situation could potentially damage the IGBT switches (e.g., 218 and 220), it has better chances of saving the SiC MOSFETs which are more expensive and not as readily available as the Si IGBT. In addition, if the fault is caused by an IGBT itself, the gate drive will turn off the IGBT softly to protect it from overvoltage.

Figure 5:
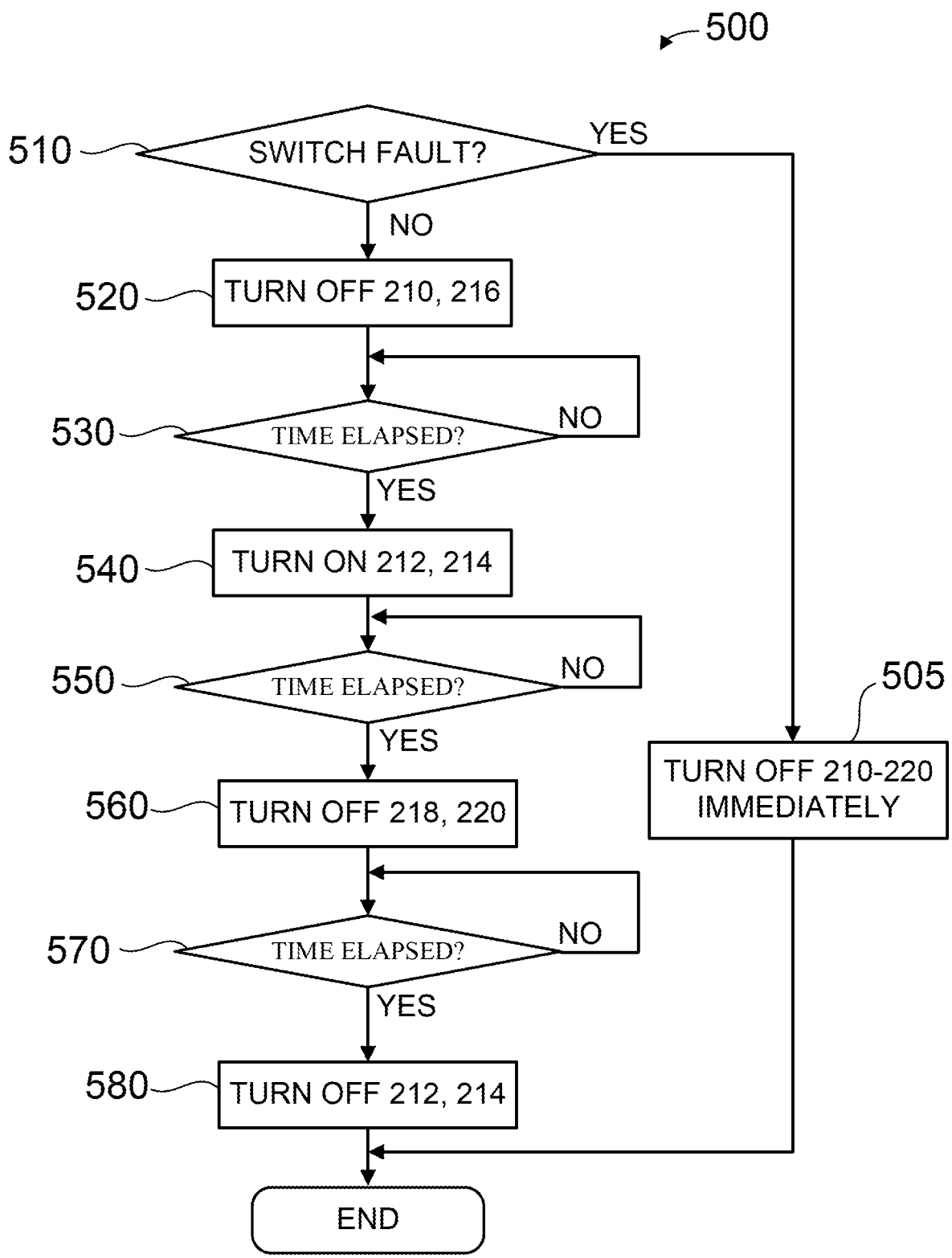
FIG. 5 is a flow-diagram of a shutdown method for the phase-leg of FIG. 2, in accordance with aspects of the present disclosure.

FIG. 5 illustrates a method 500 for shutting down an active neutral point clamped converter, in accordance with aspects of the present disclosure. If a shutdown is triggered by other faults or a manual command, the following sequence in FIG. 5 will be employed. In step 510, a determination is made if a switch fault has occurred. If the answer is yes, then all switches 210-220 are turned off immediately in step 505. Turning on a switch will transition it into a conducting state, and conversely turning off a switch will transition it into a non-conducting state. If a switch fault has not occurred, then the method proceeds to step 520. In step 520 switches 210 and 216 are turned off. Switch 210 is connected to the positive input terminal 202 and switch 216 is connected to the negative input terminal 204. This operation will permit current to flow from the neutral input terminal 206 through one of switches 212, 214 and then through one of switches 218, 220 and subsequently to output terminal 208. Switches 212, 214 are connected to the neutral input terminal 206. In step 530 a determination is made if a first predetermined time period has elapsed since turning off switches 210 and 216. The predetermined time period is about 5 µs, or 3-7 µs, or 2-8 µs, or any subranges therebetween. If the answer is no, then the method waits for the time period to elapse. If yes, then the method proceeds to step 540. In step 540, switches 212 and 214 are turned on. This operation will permit current to flow from the neutral input terminal 206 through both switches 212 and 214 and then through both switches 218, 220 and subsequently to output terminal 208. In step 550 a determination is made if the second predetermined time period has elapsed since turning on switches 212 and 214. The second predetermined time period is about 5 µs, or 3-7 µs, or 2-8 µs, or any subranges therebetween. If the answer is no, then the method waits for the time period to elapse. If yes, then the method proceeds to step 560. In step 560, switches 218 and 220 are turned off. This operation will prevent any large commutation loops from forming. In step 570 a determination is made if a third predetermined time period has elapsed since turning off switches 218 and 220. The predetermined time period is about 10 µs, or 8-12 µs, or 7-13 µs, or any subranges therebetween. If the answer is no, then the method waits for the time period to elapse. If yes, then the method proceeds to step 580. In step 580, switches 212 and 214 are turned off.

The safe shutdown sequence of method 500 eliminates the possible IGBT overvoltage scenarios. An alternative solution is to increase the turn-off resistance of the IGBT so that in a sudden trip event, the IGBT will turn off in slow speed. As a result, the voltage stress on the switch can be reduced even with commutation loop inductance. A potential disadvantage is that the larger turn-off resistance reduces the robustness of the gate driver circuit to noise interference and could potentially cause the IGBT to turn on when it is not commanded to, leading to a converter failure. The IGBT turn-off resistance can be kept at a low value for low noise susceptibility.

Figure 6:
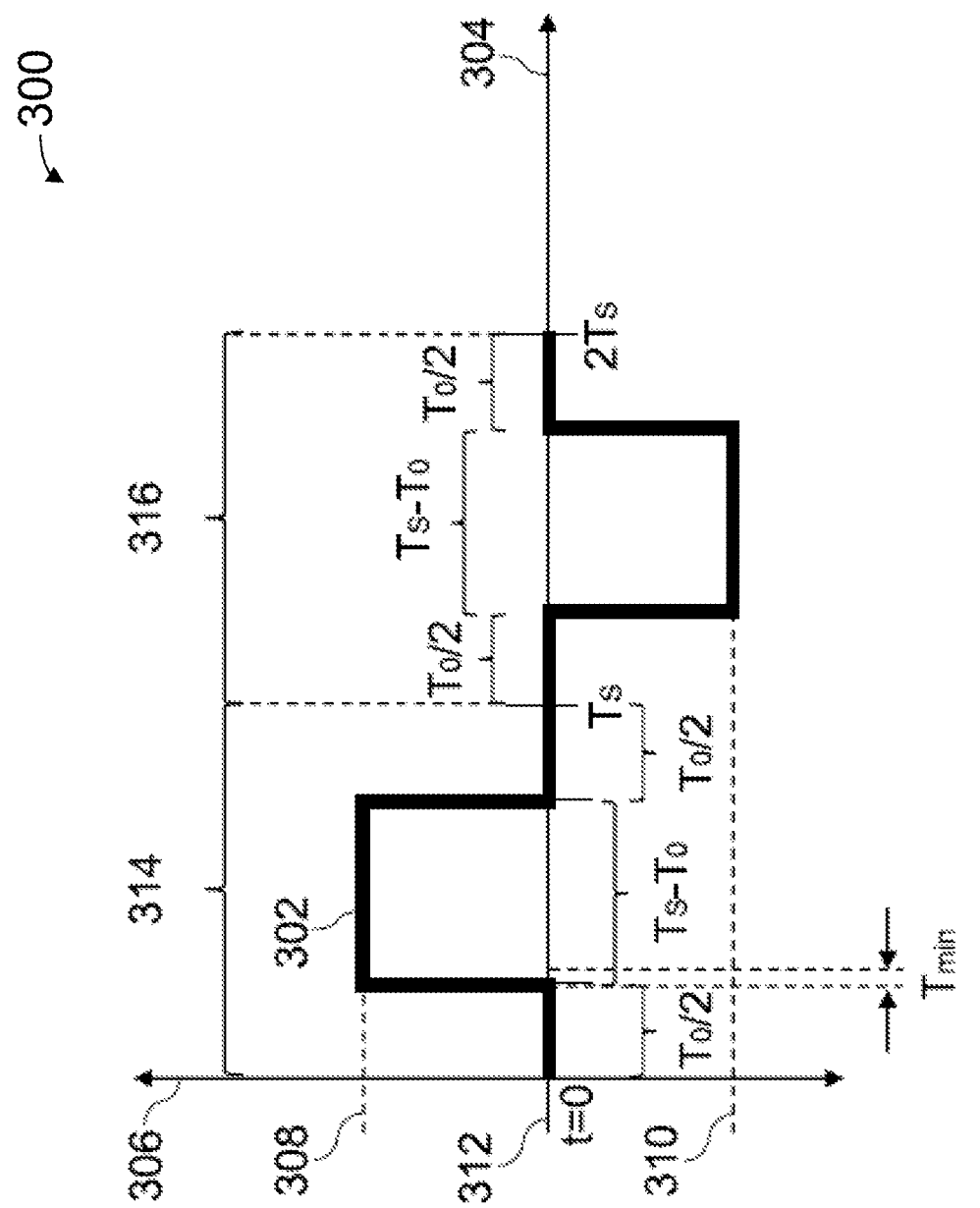
FIG. 6 is a graphical representation depicting an example signal that represents an output voltage of a phase-leg, in accordance with aspects of the present disclosure.

Referring back to FIG. 1, the controller 126 may be configured to operate the phase-leg 200 in one or more operating states including, but not limited to, a neutral state, a first intermediate neutral state, a first state, a second intermediate neutral state, or a second state. In some embodiments, the phase-leg 200, when operated in any of the neutral state, the first intermediate neutral state, or the second intermediate neutral state, may be configured to generate an output voltage having the neutral level at the output terminal 208. Moreover, the phase-leg 200, when operated in the first state, may be configured to generate the output voltage having the first level at the output terminal 208. In a similar fashion, the phase-leg 200, when operated in the second state, may be configured to generate the output voltage having the second level at the output terminal 208. A signal representative of an example output voltage of the phase-leg 200 is depicted in FIG. 6.

To transition the phase-leg 200 between the neutral state, the first intermediate neutral state, the first state, the second intermediate neutral state, and the second state, the controller 126 may be configured to selectively operate one or more of the switches 210-220 in a conducting state (ON) and operate the remaining switches in a non-conducting state (OFF). As will be appreciated, the switches operated in the conducting state allow an electrical current to pass through, while the switches operated in the non-conducting state block a flow of the electrical current therethrough. The controller 126 is configured to operate any switch in the conducting state or the non-conducting state by applying a control signal to the gate terminal of that switch 210-220.

In the embodiment of FIG. 2, the switches 210-220 are N-channel SiC MOSFETs. Accordingly, to operate any of the switches 210-220 in the conducting state, it is desirable to supply a control signal having a higher magnitude (H) to a corresponding gate terminal. It may be noted that the control signal having the higher magnitude is representative of a control signal having a magnitude that is greater than a magnitude of a signal provided to a corresponding source terminal. Similarly, to operate any of the switches 210-220 in the non-conducting state, it is desirable to supply a control signal having a lower magnitude (L) to the corresponding gate terminal. It may be noted that the control signal having the lower magnitude is representative of a control signal having a magnitude that is lower than a magnitude of a signal provided to a corresponding source terminal. Moreover, it may be noted that if P-channel SiC MOSFETs are used as the switches 210-220, the levels of the control signals may be interchanged.

Accordingly, to operate any of the switches 210-220 in the conducting state, the controller 126 may be configured to supply a control signal having the higher magnitude to the gate terminals of the respective switches. Similarly, to operate any of the switches 210-220 in the non-conducting state, the controller 126 may be configured to supply a control signal having the lower magnitude (L) to the gate terminals of the respective switches.

During operation of the phase-leg 200, commutation loops are created when one or more switches 210-220 are transitioned from the conducting state to the non-conducting state or vice-versa. An inductance of such a commutation loop is referred to as a loop inductance.

Typically, in traditional 3L-ANPC converters, large commutation loops or both the large commutation loops and small commutation loops are formed in any phase-leg. As will be appreciated, the loop inductance increases with an increase in a length of the commutation loop. Consequently, the traditional 3L-ANPC converters exhibit increased loop inductance. Disadvantageously, the increased loop inductance adversely impacts switching speed of switches of the traditional 3L-ANPC converters and also increases voltage stress on the switches of the traditional 3L-ANPC converters.

The controller 126 of the modulator 112 may be configured to operate the phase-leg 200 such that small commutation loops are formed in the phase-leg 200. Consequently, the loop inductance of the phase-leg 200 in one or more of the operating states is reduced in comparison to the loop inductance experienced by the traditional 3L-ANPC converters. The reduction in the loop inductance in turn reduces voltage stress on the switches 210-220 of the phase-leg 200. Moreover, the controller 126 may be configured to operate the switches 210-220 such that the body diodes of the switches 210-220 do not conduct currents for extended periods of time. For example, in the configuration of FIG. 2, the body diodes of some of the switches 210-220 conduct current merely for a few microseconds. Consequently, the body diodes of these switches 210-220 are protected from adverse effects of flow of current therethrough. Advantageously, such an operation of the phase-leg 200 results in improved life and reliability of the phase-leg 200 and the 3L-ANPC converter 100.

Furthermore, in accordance with the aspects of the present specification, the phase-leg 200 is additionally operated in a first intermediate state and a second intermediate state in comparison to the phase-legs of the traditional 3L-ANPC converters. Also, it may be noted that the phase-leg 200 is configured to be operated in the first and second intermediate states for a short duration, for example, a few microseconds. Typically, body diodes in the switches 210-220 are not designed for carrying current for long durations. In the traditional 3L-ANPC converters, body diodes of some switches conduct current for long durations especially while an output voltage having a neutral level is generated by the traditional 3L-ANPC converters. In accordance with the aspects of the present specification, when the phase-leg 200 is operated in a first intermediate state or a second intermediate state for a short duration, the switches 218, 220 also operate in the non-conducting state for the short duration. Advantageously, operating the phase-leg 200 in the first and second intermediate states for short durations aids in reducing the time during which the body diodes of the switches 218, 220 conduct current. Hence, the body diodes of the switches 218, 220 are protected from adverse effects of current flowing therethrough. Consequently, the reliability and useful life of the 3L-ANPC converter 100 is improved in comparison to the reliability and useful life of the traditional 3L-ANPC converters.

FIG. 6 is a graphical representation 300 depicting an example signal that represents an output voltage 302 of a phase-leg such as the phase-leg 200, in accordance with aspects of the present specification. FIG. 6 is described with reference to the components of FIG. 2.

The output voltage 302 may be obtained at the output terminal 208 of the phase-leg 200. Reference numeral 304 represents an X-axis and the reference numeral 306 represents a Y-axis. The X-axis 304 and the Y-axis 306 respectively represent time and an amplitude of the output voltage 302. Further, reference numerals 308, 310, and 312 represent a first level, a second level, and a neutral level, respectively, of the output voltage 302. Moreover, reference numerals 314 and 316 respectively represent a first cycle and a second cycle of the output voltage 302. For ease of illustration, two cycles 314, 316 of the output voltage 302 are represented in FIG. 3. It may be noted that output voltage 302 may include more than two cycles. Further, in the example of FIG. 6, the first cycle 314 is shown as a positive cycle while the second cycle 316 is shown as a negative cycle. Use of the phase-leg 200 to generate the output voltage 302 having any number of first cycles 314, any number of second cycles 316, or any combination or pattern of the first and second cycles 314, 316 is also envisioned. Moreover, use of the phase-leg 200 to generate the output voltage 302 having only the first cycles 314 or only the second cycles 316 is also envisioned.

In FIG. 6, $T_0$ represents a total time corresponding to a neutral state of the phase-leg 200. Also, $T_{min}$ represents a minimum pulse duration corresponding to any of the first, second, and third levels 308, 310, 312 of the output voltage 302, and $T_s$ represents a time period of a single cycle such as the first cycle 314 or the second cycle 316 of the output voltage 302 of the phase-leg 200.

During operation of the phase-leg 200, at time t=0, if it is assumed that the phase-leg 200 is operating in the neutral state and the output voltage 302 having the first level 308 is desired as depicted in the first cycle 314, the controller 126 is configured to transition the phase-leg 200 to the first intermediate neutral state and subsequently to a first state. Further, the controller 126 is configured to maintain the phase-leg 200 in the first state for a first determined time duration. The first determined time duration may be computed by the controller 126 based on a desired frequency and duty-cycle of the output voltage 302. Subsequent to the lapse of the first determined time duration, the controller 126 is configured to transition the phase-leg 200 back to the neutral state. In one embodiment, the controller 126 may be configured to transition the phase-leg 200 directly to the neutral state from the first state. In an alternative embodiment, the controller 126 may be configured to transition the phase-leg 200 to the neutral state from the first state via a first intermediate neutral state.

Moreover, to generate the output voltage 302 having the second level 310, the controller 126 is configured to transition the phase-leg 200 to a second intermediate neutral state and subsequently to the second state. Further, the controller 126 may be configured to maintain the phase-leg 200 in the second state for a second determined time duration. The second determined time duration may be computed by the controller 126 based on a desired frequency and duty-cycle of the output voltage 302. Subsequent to the lapse of the second determined time duration, the controller 126 may be configured to transition the phase-leg 200 back to the neutral state. In one embodiment, the controller 126 may be configured to transition the phase-leg 200 directly to the neutral state from the second state. Alternatively, the controller 126 may be configured to transition the phase-leg 200 to the neutral state from the second state via the second intermediate neutral state.

Advantageously, operating the phase-leg 200 in the first intermediate neutral state while transitioning from the neutral state to the first state or vice-versa and operating the phase-leg 200 in the second intermediate neutral state while transitioning from the neutral state to the second state, or vice-versa, result in small commutation loops in the phase-leg 200 due to corresponding switching of the switches 210-220 as described hereinabove. Consequent to operating the phase-leg 200 with such small commutation loops, the overall loop inductance of the phase-leg 200 at any given point of time is reduced. This reduction in the overall loop inductance reduces voltage stress across the switches 210-220 of the phase-leg 200. Consequently, the life-time and the reliability of the switches 210-220 and the 3L-ANPC converter 100 may be improved.

Figure 7:
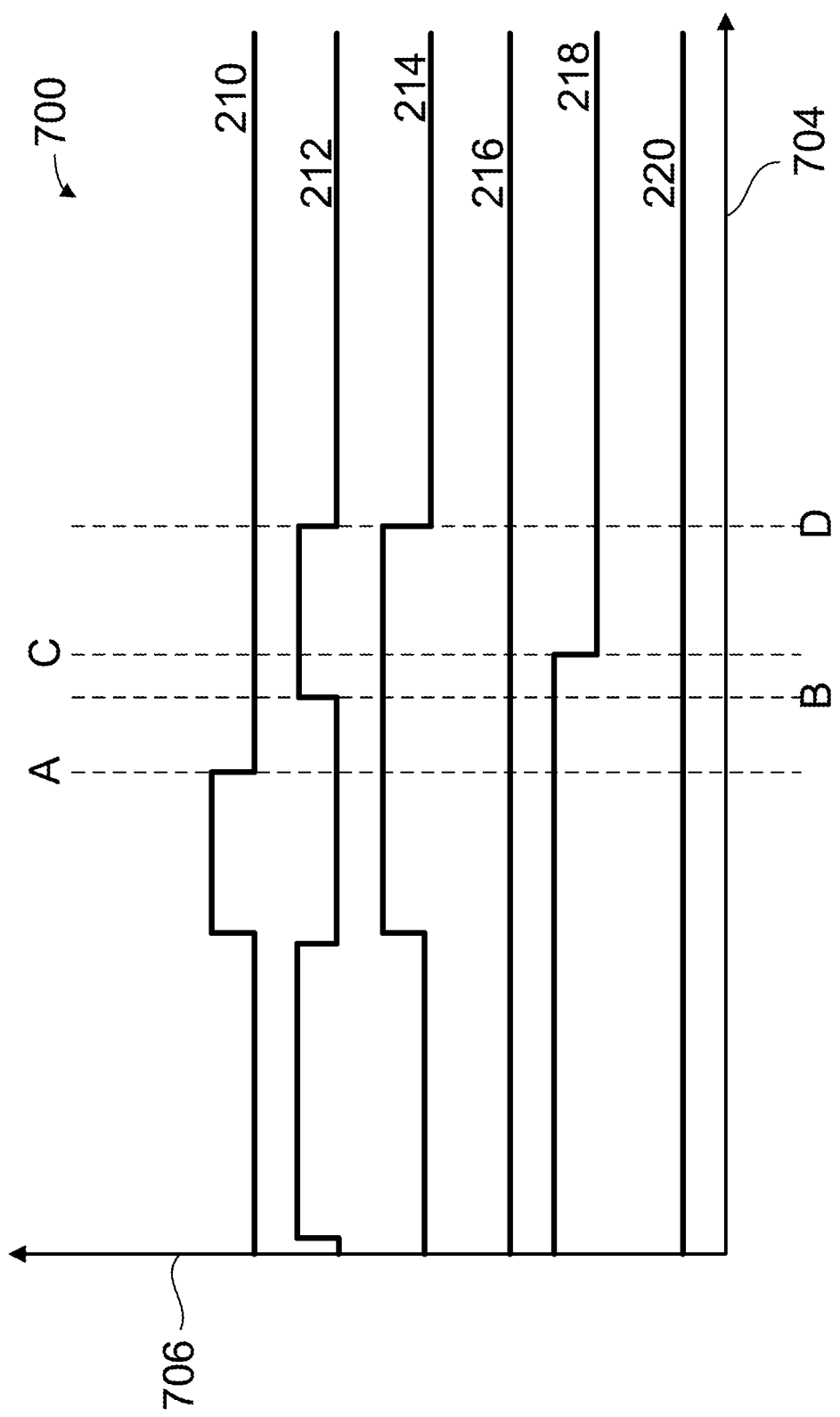
FIG. 7 is a graphical representation depicting an example signal that represents a shutdown sequence, in accordance with aspects of the present disclosure.

FIG. 7 is a graphical representation 700 depicting one example signal that represents a shutdown sequence in a positive duty ratio, in accordance with aspects of the present specification. FIG. 7 is described with reference to the components of FIG. 2. Reference numeral 704 represents an X-axis and the reference numeral 706 represents a Y-axis. The X-axis 704 and the Y-axis 706 respectively represent time and an amplitude of the gate or control voltage. At time period A, switch 210 is turned off. At time period B switch 212 is turned on. At time period C, switch 218 is turned on, and at time period D both switches 212 and 214 are turned off. This is one sequence of gate control signals that will ensure that small commutation loops are used in the converter during a shutdown.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be limited by the foregoing description, but is only limited by the scope of the appended claims.

The invention claimed is:

1. A method for shutting down a phase-leg of a three-level active neutral point clamped converter, the phase-leg comprising an output terminal, a plurality of input terminals, and a plurality of switches disposed therebetween, the plurality of switches including at least a first switch, a second switch, a third switch, a fourth switch, a fifth switch, and a sixth switch, the method comprising:

determining if a switch fault has occurred, and responsive to determining that the switch fault has not occurred, performing a shutdown operation that comprises, from an initial state in which the first switch, the fourth switch, the fifth switch, and the sixth switch are on and the second switch and the third switch are off:

operating the plurality of switches to turn off the first switch and the fourth switch;

waiting for a first predetermined time period to elapse after turning off the first switch and the fourth switch;

operating the plurality of switches to turn on the second switch and the third switch after waiting for the first predetermined time period to elapse;

waiting for a second predetermined time period to elapse after turning on the second switch and the third switch;

operating the plurality of switches to turn off the fifth switch and the sixth switch after waiting for the second predetermined time period to elapse;

waiting for a third predetermined time period to elapse after turning off the fifth switch and the sixth switch; and operating the plurality of switches to turn off the second switch and the third switch after waiting for the third predetermined time period to elapse.

2. The method of claim 1, wherein the plurality of input terminals comprises a first input terminal, a second input terminal, and a neutral input terminal, wherein the first switch, the second switch, the third switch, and the fourth switch of the plurality of switches are operatively coupled such that the second and third switches are disposed between the first and fourth switches, wherein the first switch is operatively coupled to the first input terminal and the fourth switch is operatively coupled to the second input terminal, wherein an interconnection point of the second switch and the third switch is operatively coupled to the neutral input terminal, wherein the fifth switch is operatively coupled between the output terminal and an interconnection point of the first switch and the second switch, and wherein the sixth switch is operatively coupled between the output terminal and an interconnection point of the third switch and the fourth switch.

3. The method of claim 1, wherein the first input terminal comprises a positive voltage level input terminal, and the second input terminal comprises a negative voltage level input terminal.

4. The method of claim 1, wherein each of the first predetermined time period and the second predetermined time period is between 2 μs and 8 μs.

5. The method of claim 1, wherein the third predetermined time period is greater than each of the first predetermined time period and the second predetermined time period.

6. The method of claim 1, wherein the third predetermined time period is between 7 μs and 13 μs.

7. The method of claim 1, wherein the first, second, third, fourth, fifth, and sixth switches are metal-oxide-semiconductor field-effect transistors.

8. The method of claim 1, wherein the first, second, third, fourth, fifth, and sixth switches are at least one of transistors, gate commutated thyristors, field effect transistors, insulated gate bipolar transistors, gate turn-off thyristors, static induction transistors, or static induction thyristors.

9. The method of claim 1, wherein, responsive to determining that the switch fault has occurred, operating the plurality of switches to immediately turn off all of the switches of the plurality without performing the shutdown operation.

10. A three-level active neutral point clamped converter, comprising:
one or more phase-legs, wherein at least a first phase-leg of the one or more phase-legs comprises:
an output terminal;
a plurality of input terminals comprising a first input terminal, a second input terminal, and a neutral input terminal; and
a plurality of switches disposed between the plurality of input terminals and the output terminal, wherein the plurality of switches comprises a first switch, a second switch, a third switch, a fourth switch, a fifth switch, and a sixth switch, wherein the first switch, the second switch, the third switch, and the fourth switch of the plurality of switches are operatively coupled such that the second and third switches are disposed between the first and fourth switches,
wherein the first switch is operatively coupled to the first input terminal and the fourth switch is operatively coupled to the second input terminal, wherein an interconnection point of the second switch and the third switch is operatively coupled to the neutral input terminal, wherein the fifth switch is operatively coupled between the output terminal and an interconnection point of the first switch and the second switch, and wherein the sixth switch is operatively coupled between the output terminal and an interconnection point of the third switch and the fourth switch; and
a modulator operatively coupled to the plurality of switches of the first phase-leg and configured to shut down the first phase-leg by, from an initial state in which the first switch, the fourth switch, the fifth switch, and the sixth switch are on and the second switch and the third switch are off:
operating the plurality of switches to turn off the first switch and the fourth switch;
waiting for a first predetermined time period to elapse after turning off the first switch and the fourth switch;
operating the plurality of switches to turn on the second switch and the third switch after waiting for the first predetermined time period to elapse;
waiting for a second predetermined time period to elapse after turning on the second switch and the third switch;
operating the plurality of switches to turn off the fifth switch and the sixth switch after waiting for the second predetermined time period to elapse;
waiting for a third predetermined time period to elapse after turning off the fifth switch and the sixth switch; and
operating the plurality of switches to turn off the second switch and the third switch after waiting for the third predetermined time period to elapse.

11. The converter of claim 10, wherein the first input terminal comprises a positive voltage level input terminal, and the second input terminal comprises a negative voltage level input terminal.

12. The converter of claim 10, wherein each of the first predetermined time period and the second predetermined time period is between 2 μs and 8 μs.

13. The converter of claim 10, wherein the third predetermined time period is greater than each of the first predetermined time period and the second predetermined time period.

14. The converter of claim 10, wherein the third predetermined time period is between 7 μs and 13 μs.

15. The converter of claim 10, wherein the first, second, third, fourth, fifth, and sixth switches are metal-oxide-semiconductor field-effect transistors.

16. The converter of claim 10, wherein the first, second, third, fourth, fifth, and sixth switches are at least one transistors, gate commutated thyristors, field effect transistors, insulated gate bipolar transistors, gate turn-off thyristors, static induction transistors, or static induction thyristors.

17. The converter of claim 10, wherein a drain terminal of the first switch is conductively connected to the first input terminal to operatively couple the first switch to the first input terminal, and a source terminal of the fourth switch is conductively connected to the second input terminal to operatively couple the fourth switch to the second input terminal.

18. A three-level active neutral point clamped converter comprising:
a phase-leg comprising:
an output terminal;
a plurality of input terminals comprising a first input terminal, a second input terminal, and a neutral input terminal; and
a plurality of switches disposed between the plurality of input terminals and the output terminal, wherein the plurality of switches comprises a first switch, a second switch, a third switch, a fourth switch, a fifth switch, and a sixth switch,
wherein the first switch, the second switch, the third switch, and the fourth switch of the plurality of switches are operatively coupled such that the second and third switches are disposed between the first and fourth switches, wherein the first switch is operatively coupled to the first input terminal and the fourth switch is operatively coupled to the second input terminal, wherein an interconnection point of the second switch and the third switch is operatively coupled to the neutral input terminal, wherein the fifth switch is operatively coupled between the output terminal and an interconnection point of the first switch and the second switch, and wherein the sixth switch is operatively coupled between the output terminal and an interconnection point of the third switch and the fourth switch, and a modulator operatively coupled to the plurality of switches of the phase-leg and configured to shut down the phase-leg by, from an initial state in which the first switch, the fourth switch, the fifth switch, and the sixth switch are on and the second switch and the third switch are off:

turning off the first switch and the fourth switch;

turning on the second switch and the third switch subsequent to turning off the first switch and the fourth switch;

turning off the fifth switch and the sixth switch subsequent to turning on the second switch and the third switch; and turning off the second switch and the third switch subsequent to turning off the fifth switch and the sixth switch.

19. The converter of claim 18, wherein a drain terminal of the first switch is conductively connected to the first input terminal to operatively couple the first switch to the first input terminal, and a source terminal of the fourth switch is conductively connected to the second input terminal to operatively couple the fourth switch to the second input terminal.

20. The converter of claim 18, wherein the first, second, third, fourth, fifth, and sixth switches are metal-oxide-semiconductor field-effect transistors.

* * * * *